May 19, 1931.  J. MANKO  1,806,480
MOWING MACHINE
Filed Aug. 22, 1930    4 Sheets-Sheet 1

Inventor
J. Manko.
By Bryant & Lowry
Attorneys

May 19, 1931.  J. MANKO  1,806,480
MOWING MACHINE
Filed Aug. 22, 1930   4 Sheets-Sheet 2

Inventor
J. Manko.
By Bryant & Lowry
Attorneys

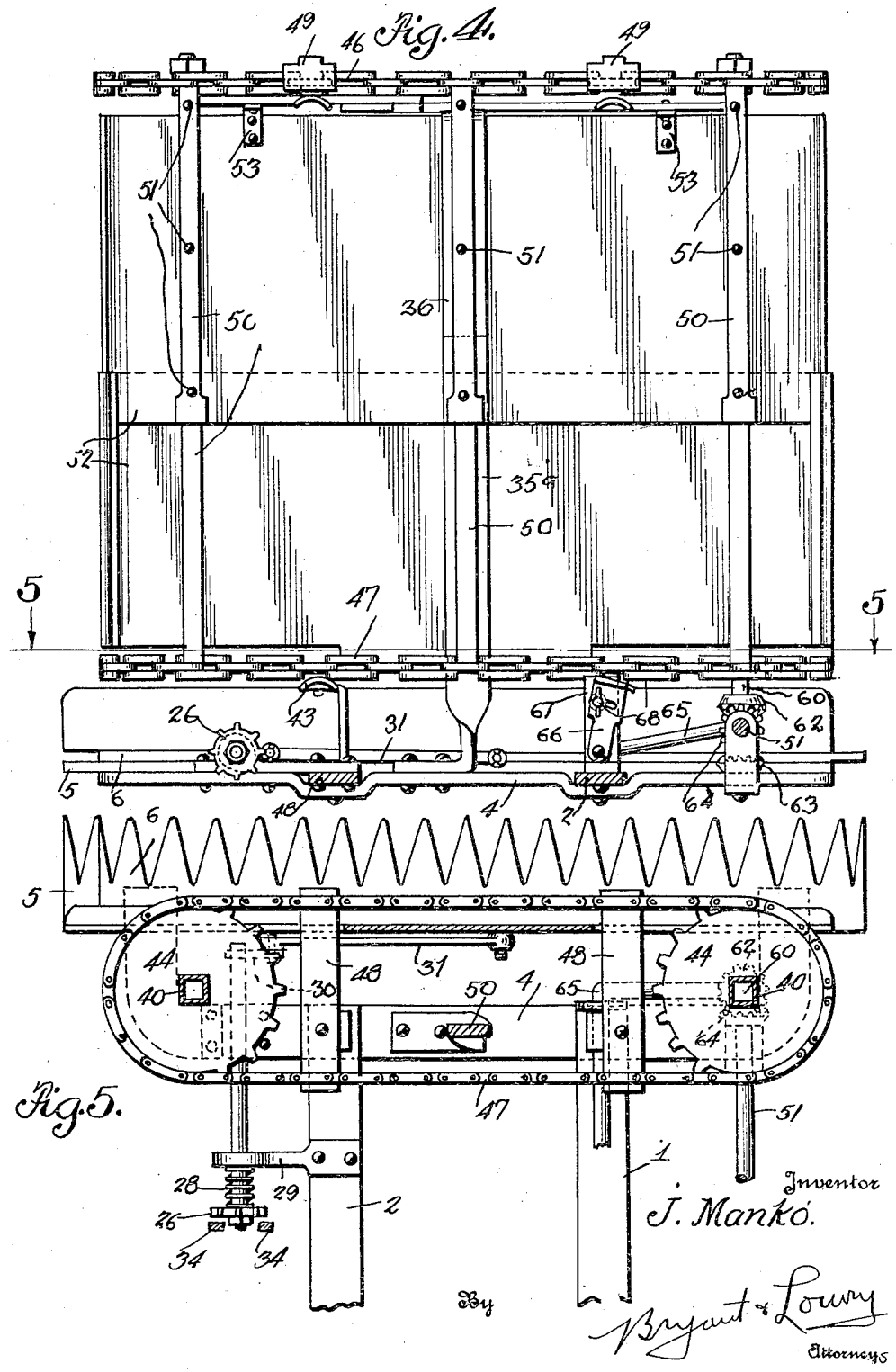

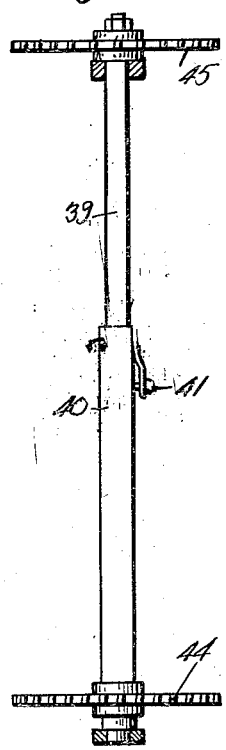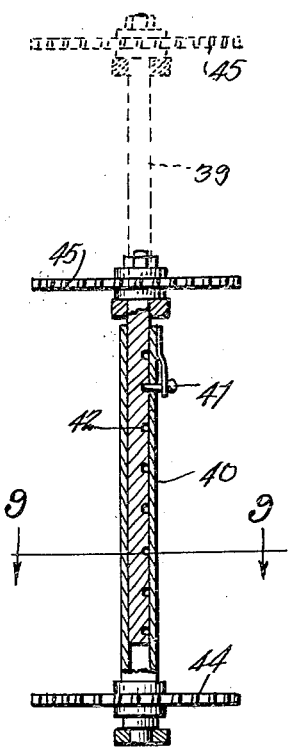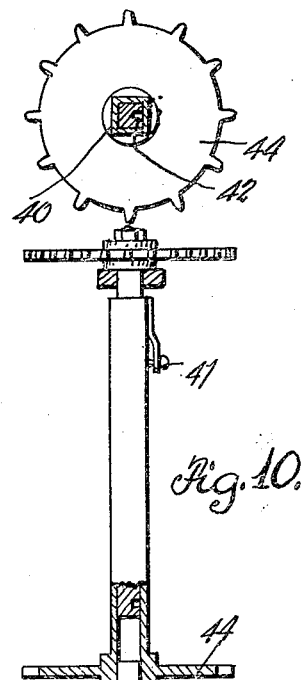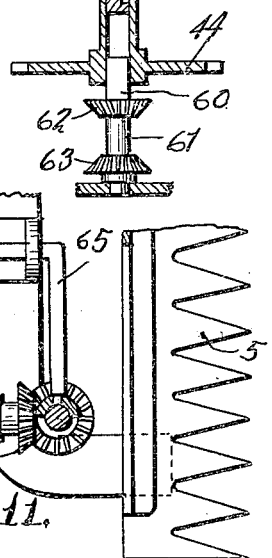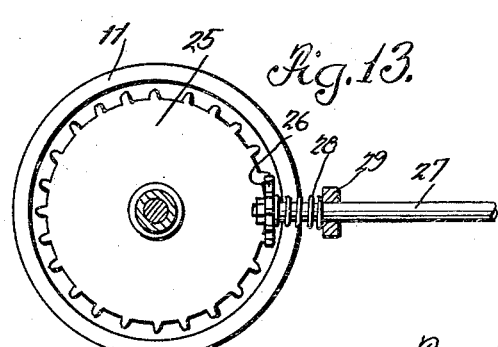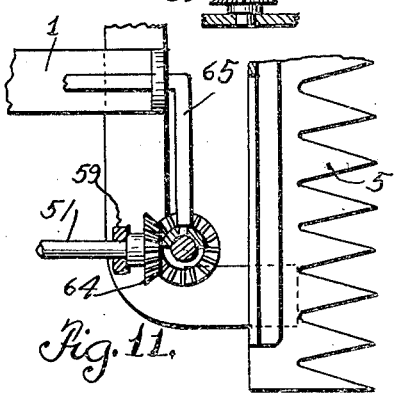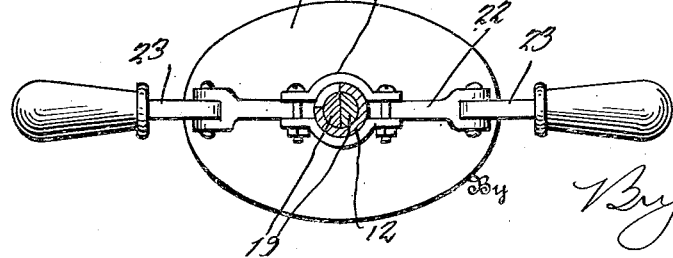

Patented May 19, 1931

1,806,480

UNITED STATES PATENT OFFICE

JOZSEF MANKÓ, OF OZD, HUNGARY, ASSIGNOR OF ONE-HALF TO GABOR KOVACS, OF WARRENSVILLE, OHIO

MOWING MACHINE

Application filed August 22, 1930. Serial No. 477,109.

This invention relates to certain new and useful improvements in mowing machines of the manually operated type embodying a forwardly positioned horizontal reciprocating cutter bar operatively engaged with one of the ground wheels of the machine and having superposed upon the machine frame, an endless conveyor or gathering device operatively engaged with the other ground wheel of the machine for moving or displacing the cut grass and the like laterally of the path of travel of the machine into rows for later gathering.

A further object of the invention is to provide a mowing machine of the foregoing type wherein the conveying device for shifting the cut grass and the like laterally of the machine, may be manually operated while the machine is at rest.

With the above and other objects in view that will become apparent as the nature of the invention is better understood, the same consists in the novel form, combination and arrangement of parts hereinafter more fully described, shown in the accompanying drawings and claimed.

In the drawings:—

Figure 2 is a side elevational view of the same showing the forwardly positioned horizontal reciprocating cutter bar and its superposed conveyor for laterally shifting the cut grass and the like;

Figure 4 is a vertical cross-sectional view taken on line 4—4 of Figure 1;

Figure 5 is a horizontal sectional view taken on line 5—5 of Figure 4 showing the driving devices for the cutter bar and the driving devices for the conveyor;

Figure 7 is a side elevational view of one of the end vertically adjustable posts supporting the endless conveyor;

Figure 8 is a longitudinal sectional view of one of the posts showing the devices for holding the same in extended position;

Figure 9 is a cross-sectional view taken on line 9—9 of Figure 8;

Figure 10 is a side elevational view, partly in section of the other end post supporting the endless conveyor;

Figure 11 is a detail sectional view taken on line 11—11 of Figure 6 showing the clutch device for rendering the endless conveyor inoperative;

Figure 12 is a cross-sectional view taken on line 12—12 of Figure 2; and

Figure 13 is a detail sectional view showing one of the ground wheels and the separable gear connections between the wheels and cutter bar.

Figure 1:
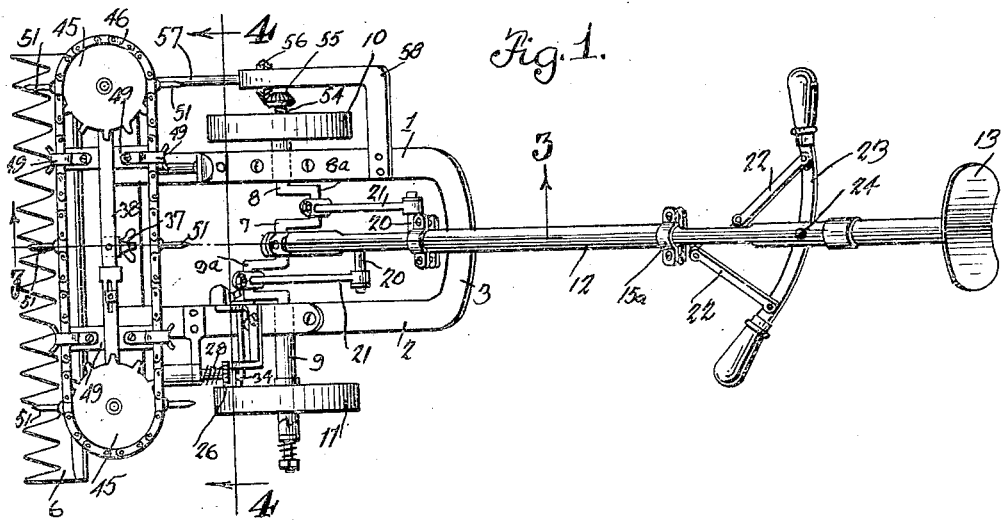
Figure 1 is a top plan view of a mowing machine constructed in accordance with the present invention.
Figure 3:
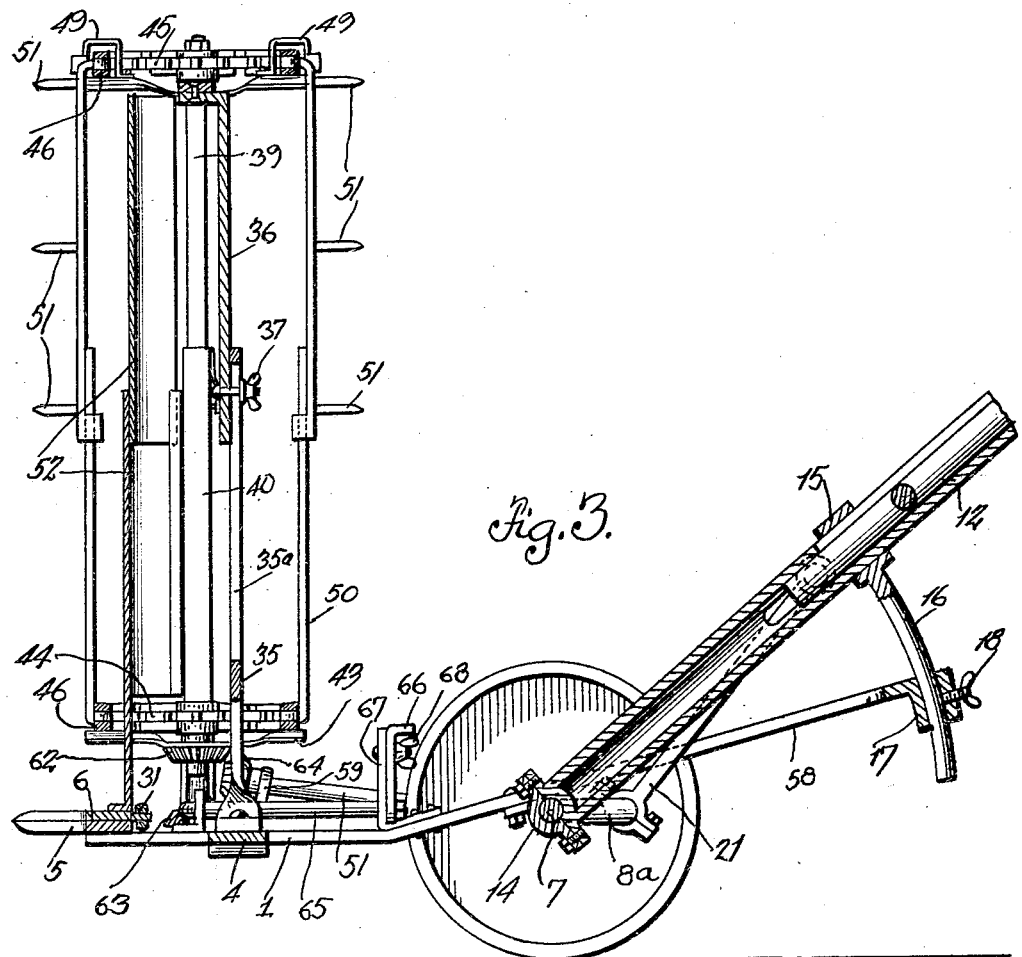
Figure 3 is a longitudinal sectional view taken on line 3—3 of Figure 1.

Referring more in detail to the accompanying drawings, there is illustrated a mowing machine comprising a U-shaped frame as shown in Figure 1 having side bars 1 and 2 connected by a cross bar 3, the forward ends of the side bars 1 and 2 being attached to a cross bar 4 as shown in Figure 3 and extending forwardly of the cross bar as illustrated. The forward ends of the side bars 1 support a stationary horizontal cutter bar 5 with which is superposed reciprocating cutter bar 6 is associated and to be operated by devices presently to be described.

A shaft 7 has the opposite end portions 8 and 9 thereof journalled in the side frame bars 1 and 2 as at 8 and 9 and extend outwardly of the frame bars to support freely mounted ground wheels 10 and 11.

Figure 2:
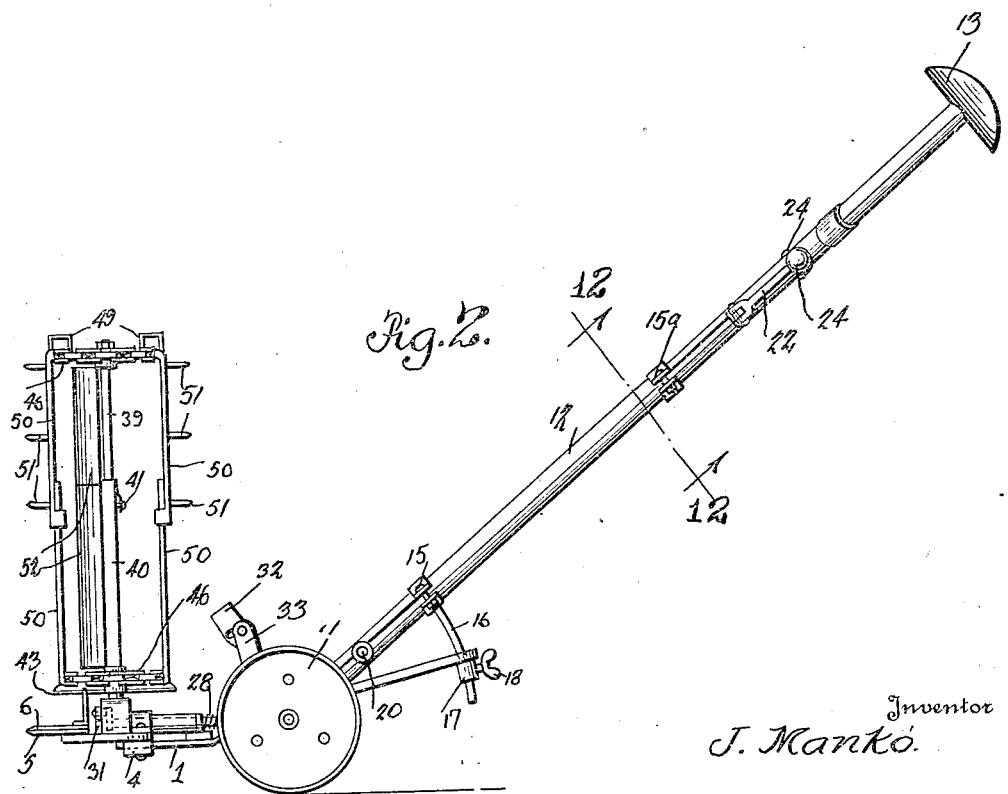

A handle structure is supported on the shaft 7 and cross-bar 3 of the frame as shown in Figures 1 to 3 and comprises a tubular handle 12 carrying a breast plate 13 at its rear end while the forward end thereof is attached to the shaft 7 by a strap bearing 14. The handle structure may be supported at different inclinations upon the shaft 7 and frame structure by devices including the collar 15 enclosing the tubular handle 12 and having an arcuate or curved rod 16 depending therefrom and extending through the bearing 17 carried by the cross-bar 3 of the frame and held in adjusted positions by the set screw 18. A pair of reciprocating rods 19 are confined within the tubular handle 12 as shown in Figures 1 to 3 and 12, the lower end of the tubular handle 12 being diametrically slotted with side pins 20 projecting through the handle slot and having attached to their outer ends, links 21, the other ends of which are attached to the crank portions 8a and 9a respectively of the ends of the shaft 7 within the frame bars 1 and 2 as shown in Figure 1. The upper end of the handle bar 12 is diametrically slotted to expose the upper ends of the reciprocating rods 19 that are pivotally connected to links 22, the other ends of which links are attached to the cross handle 23 that is pivotally mounted as at 24 upon the tubular handle 12, the tubular handle being formed of longitudinal sections secured together by the collar 15 and clamp 15a.

The operating devices for the reciprocating cutter bar 6 are shown more clearly in Figures 1, 5 and 13, the ground wheel 11 having a gear wheel 25 fixed thereto that is adapted to be engaged by the pinion 26 splined upon the shaft 27 and moved by the spring 28 into engagement with the gear wheel 25, the shaft 27 being journaled in brackets 29 carried by the frame bar 2 and in the forward cross frame bar 4. The forward end of the shaft 27 carries a crank arm 30 attached to the pitman rod 31, the other end of which pitman rod is engaged with the reciprocating cutter bar 6 as shown in Figure 3. Upon rotation of the ground wheel 11, rotary motion is imparted to the shaft 27 and reciprocating cutter bar. When it is desired to place the reciprocating cutter bar out of operation, the lever 32 that is pivoted upon the bracket 33 as shown in Figure 2 has the lower forked end 34 thereof, as shown in Figure 5, engaged with the pinion 26 to shift the same against the tension of the spring 28 for separating the pinion 26 from the driving gear wheel 25.

Means is provided for conveying or shifting the cut grass or the like laterally of the path of travel of the machine and is in the form of an endless conveyor disposed above the horizontal cutter bar and supported on the forward cross frame bar 4. A frame structure for the support of the endless conveyor includes a two part standard having lower and upper sections 35 and 36 as shown in Figure 3, the lower section 35 being longitudinally slotted as at 35a to accommodate the passage of the adjusting screw 37 for holding the sections 35 and 36 in vertically adjusted position, the lower section 35 being secured to the lower cross bar 4 while the upper end of the upper section 36 is secured to a cross bar 38. The opposite end of the cross bar 38 is associated with vertically adjustable sectional posts, each comprising an upper section 39 telescoping in a lower section 40, and vertically adjustable by the tensioned pin 41 carried by the lower section 40 and extending through an opening in the side thereof to be selectively received in vertically spaced sockets 42 in the upper section 39, as shown in Figure 8. The lower end of each post section 40 is supported on a bracket 43 disposed above the cross bar 4 as shown in Figure 3 and carries a fixed sprocket wheel 44 located above the bracket 43. The upper end of each post section 39 has a sprocket wheel 45 fixed thereto, the vertically adjustable posts being located at each end of the cross bar 4. A sprocket chain 46 encloses and travels around the upper sprocket wheels 45 while a sprocket chain 47 travels around the lower sprocket wheels 44, the lower sprocket chain 47 being supported at opposite sides thereof between the sprocket wheels 44 by the arms 48 as shown in Figure 5, while the upper sprocket chain 46 is supported at opposite sides thereof and guided in its movement by the arms 49 shown more clearly in Figures 1 and 4. Extensible rods 50 are attached at their ends to the sprocket chains 46 and 47, the upper sections of the rods 50 carrying outwardly directed tines or fingers 51 functioning as a rake in laterally conveying the cut grass or the like for disposal to one side of the path of travel of the machine. The sectional rods 50 are arranged in spaced relation and any number desired may be provided. A front guard wall is provided to prevent the mowed grass or the like from falling into the machine and comprises extensible sections 52, the upper one of which is vertically adjustable and suitably attached to the upper cross bar 38 as shown by the reference numeral 53 in Figure 4.

Figure 6:
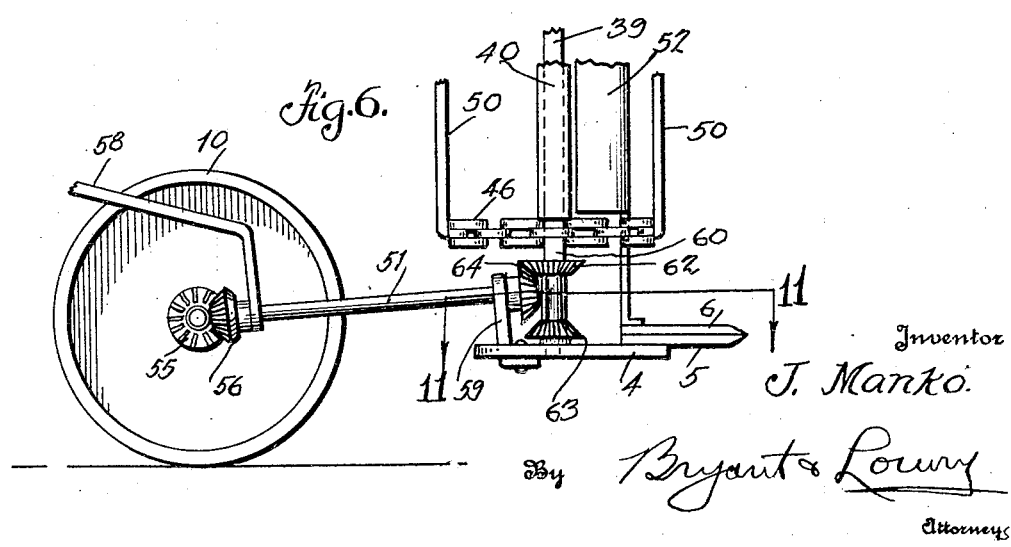
Figure 6 is a fragmentary end elevational view showing the driving devices for the conveyor.

The driving devices for the endless conveyor are associated with the end post forwardly of the ground wheel 10. The shaft end 8 of the crank shaft 7 is equipped with a clutch device 54 outwardly of the wheel 10 for effecting rotation of the crank shaft 7 and for driving the bevel gear 55 upon the shaft end 8. The gear 55 meshes with a bevel gear 56 upon one end of the shaft 57, the shaft being journalled in bracket 58 carried by the frame bar 1 and in the bracket 59 on the frame bar 4 as shown in Figures 6 and 11. The lower end of the hollow post section 40 forwardly of the ground wheel 10 receives one end of a key shaft 60, the lower end of which is journalled in the frame bar 4, the key shaft 60 having a collar 61 splined thereon carrying bevel gears 62 and 63 at opposite ends thereof to be selectively engaged with the pinion 64 upon the adjacent end of the shaft 51. The gears 62 and 63 are selectively engaged with the pinion 64 for causing the endless conveyor to travel in opposite directions for throwing the cut grass or the like to either side of the machine, this selective operation being accomplished by the arm 65 engaged by the collar 61 as shown in Figure 11 and having an operating handle 66 as shown in Figure 3 movable over a supporting bracket 67 and retained in adjusted positions by the set screw 68.

During forward movement of the machine, the ground wheel 11 operates the forwardly positioned horizontal cutter bar and the operation thereof may be discontinued while the machine is still forwardly propelled by disengaging the pinion 26 from the driving gear 25. The ground wheel 10 effects operation of the endless conveyor while the direction of movement thereof is controlled by the gears 62 and 63 shown in Figures 10 and 11. During forward movement of the machine, the cross arm 23 moves upon its pivotal mounting 24 and while the machine is at rest, the cross arm 23 may be manually operated to effect movement of the crank shaft 7 and endless conveyor so that the machine may be moved into proximity of a pile for lateral discharge or displacement of cut grass or the like.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. In a mowing machine of the character described, a frame, ground wheels, a forwardly positioned horizontal cutter operatively connected with a ground wheel, a horizontally moving endless conveyor above the cutter and operatively connected with the other ground wheel, the operative connections including a crank shaft journalled on the frame and on which the wheels are mounted, and manually operated means for rotating the crank shaft.

2. In a mowing machine of the character described, a frame, ground wheels, a forwardly positioned horizontal cutter operatively connected with a ground wheel, a horizontally moving endless conveyor above the cutter and operatively connected with the other ground wheel, a guard wall between the sides of the conveyor, the operative connections including a crank shaft journalled on the frame and on which the wheels are mounted, and manually operated means for rotating the crank shaft.

3. In a mowing machine of the character described, a frame, ground wheels, a forwardly positioned horizontal cutter operatively connected with a ground wheel, a horizontally moving endless conveyor above the cutter and operatively connected with the other ground wheel, said conveyor being vertically adjustable, the operative connections including a crank shaft journalled on the frame and on which the wheels are mounted, and manually operated means for rotating the crank shaft.

4. In a mowing machine of the character described, a frame, ground wheels, a forwardly positioned horizontal cutter operatively connected with a ground wheel, a horizontally moving endless conveyor above the cutter and operatively connected with the other ground wheel, a guard wall between the sides of the conveyor, said conveyor being vertically adjustable, the operative connections including a crank shaft journalled on the frame and on which the wheels are mounted, and manually operated means for rotating the crank shaft.

5. In a mowing machine of the character described, a frame, ground wheels, a forwardly positioned horizontal cutter operatively connected with a ground wheel, a horizontally moving endless conveyor above the cutter and operatively connected with the other ground wheel, the operative connections including a crank shaft journalled on the frame and on which the wheels are mounted, manually operated means for rotating the crank shaft, said means including a hollow handle angularly adjustable on the frame, a lever pivoted on the handle, slide rods in the hollow handle, and connections between the slide rods, lever and crank portions of the crank shaft.

6. In a mowing machine of the character described, a frame, ground wheels, a forwardly positioned horizontal cutter operatively connected with a ground wheel, a horizontally moving endless conveyor above the cutter and operatively connected with the other ground wheel, a guard wall between the sides of the conveyor, the operative connections including a crank shaft journalled on the frame and on which the wheels are mounted, manually operated means for rotating the crank shaft, said means including a hollow handle angularly adjustable on the frame, a lever pivoted on the handle, slide rods in the hollow handle, and connections between the slide rods, lever and crank portions of the crank shaft.

7. In a mowing machine of the character described, a frame, ground wheels, a forwardly positioned horizontal cutter operatively connected with a ground wheel, a horizontally moving endless conveyor above the cutter and operatively connected with the other ground wheel, said conveyor being vertically adjustable, the operative connections including a crank shaft journalled on the frame and on which the wheels are mounted, manually operated means for rotating the crank shaft, said means including a hollow handle angularly adjustable on the frame, a lever pivoted on the handle, slide rods in the hollow handle, and connections between the slide rods, lever and crank portions of the crank shaft.

8. In a mowing machine of the character described, a frame, ground wheels, a forwardly positioned horizontal cutter operatively connected with a ground wheel, a horizontally moving endless conveyor above the cutter and operatively connected with the other ground wheel, a guard wall between the sides of the conveyor, said conveyor being vertically adjustable, the operative connections including a crank shaft journalled on the frame and on which the wheels are mounted, manually operated means for rotating the crank shaft, said means including a hollow handle angularly adjustable on the frame, a lever pivoted on the handle, slide rods in the hollow handle, and connections between the slide rods, lever and crank portions of the crank shaft.

In testimony whereof I affix my signature.

JOZSEF MANKÓ.